United States Patent [19]

Lam

[11] Patent Number: 5,031,462
[45] Date of Patent: Jul. 16, 1991

[54] SNAP-FIT CONSTRUCTION LOW COST PRESSURE SENSING DEVICE

[75] Inventor: Man K. Lam, Colorado Springs, Colo.

[73] Assignee: Honeywell Inc., Minneapolis, Minn.

[21] Appl. No.: 348,518

[22] Filed: May 8, 1989

[51] Int. Cl.[5] ............................................. G01L 7/00
[52] U.S. Cl. ...................................... 73/756; 73/726; 73/727; 338/4
[58] Field of Search ................ 73/756, 726, 727, 728, 73/723–725, 720, 753; 338/4

[56] References Cited

U.S. PATENT DOCUMENTS

| | | | |
|---|---|---|---|
| 3,587,322 | 6/1971 | Lobdell et al. | 73/756 |
| 3,899,766 | 8/1975 | Mermelstein | 338/42 |
| 4,040,297 | 8/1977 | Karsmakers et al. | 73/725 |
| 4,116,075 | 9/1978 | Ort | 73/708 |
| 4,145,588 | 3/1979 | Orcutt | 200/83 P |
| 4,373,397 | 2/1983 | Keller | 73/721 |
| 4,500,864 | 2/1985 | Nakane et al. | 338/4 |
| 4,505,157 | 3/1985 | Hong Le | 73/756 |
| 4,513,623 | 4/1985 | Kurtz et al. | 73/721 |
| 4,519,255 | 5/1985 | Ishii | 73/727 |
| 4,625,561 | 12/1986 | Mikkor | 73/724 |
| 4,655,088 | 4/1987 | Adams | 73/756 |
| 4,691,575 | 9/1987 | Sonderegger et al. | 73/727 |
| 4,770,045 | 9/1988 | Nakagawa et al. | 73/726 |
| 4,773,972 | 9/1988 | Mikkor | 73/724 |
| 4,825,876 | 5/1989 | Beard | 73/756 |

*Primary Examiner*—Joseph A. Orsino
*Assistant Examiner*—Brent A. Swarthout
*Attorney, Agent, or Firm*—Merchant & Gould

[57] ABSTRACT

A pressure sensing device comprising a body member and a cap member constructed with a simple snap-fit for assembly and disassembly. The assembled device permits non-bonded contact of conductive leads with electrically conductive elements of a pressure-responsive transducer die for sensing pressure and transmitting signals generated by the force of a pressurized medium in hollow a chamber of the body member. A seal provides for functional reliability independent of thermal cycling stresses.

9 Claims, 2 Drawing Sheets

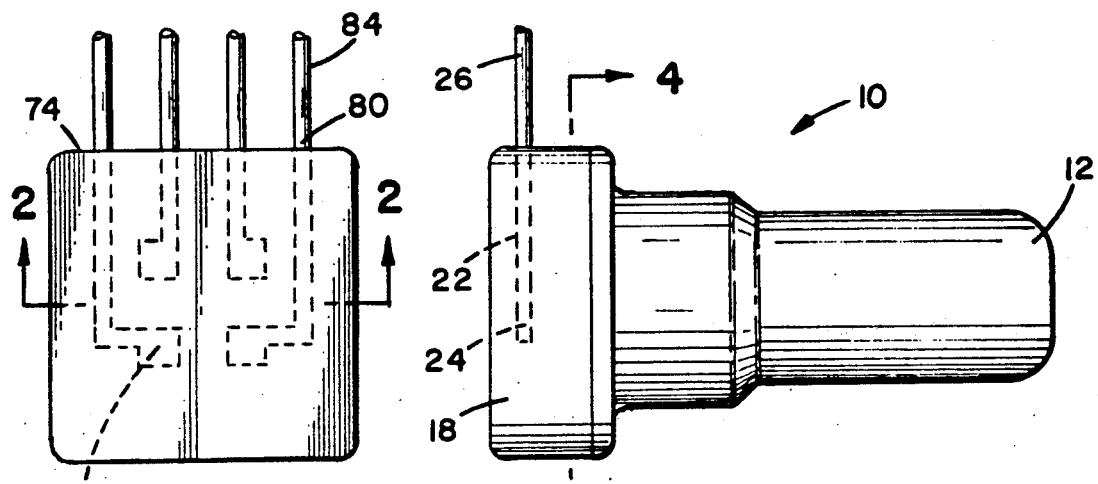
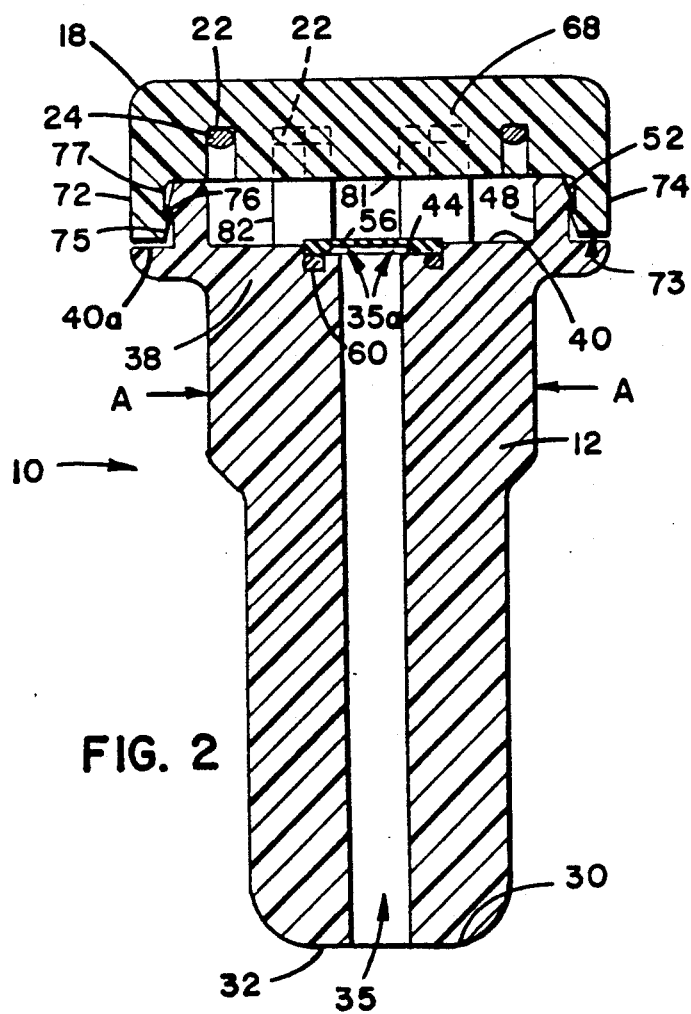

SNAP-FIT CONSTRUCTION LOW COST PRESSURE SENSING DEVICE

TECHNICAL FIELD OF THE INVENTION

The present invention relates generally to the field of pressure sensing devices and more specifically to a pressure sensing device of simple construction having a body member and a snap-fit cap member.

BACKGROUND OF THE INVENTION

Within the field of pressure sensing devices, there exists a need for devices which reliably convert sensed pressures of a medium into electrical signals. Commonly such devices use piezo-resistive pressure cells which employ resistive membranes across a pressurized medium. As plastic elongation of the membrane occurs under pressure, the measured resistance yields signals correlating to predetermined pressures. However, a particular problem occurs when the device is subjected to thermal cycling, such as in hostile environments. This frequently results in thermal cycling induced expansion of the material which the device is constructed of imparting false pressure signals to the resistive membrane. In other words, the ambient thermal cycling causes mechanical elongation of the sensing membrane which then generates a false electrical signal.

Yet another problem occurs in pressure sensing devices due to the complex construction of these devices. Some pressure sensing structures consist of many fittings and require bonding of leads between fittings. Other devices may require crimping or movement of threaded sleeves in order to join the various parts or fittings to form a complete device. These structures are often expensive to manufacture due to the many steps involved in assembly.

What has been needed, therefore, is a pressure sensing device which accurately senses pressure of a pressurized medium and converts the sensed pressure to an electrical signal which is independent of ambient thermal cycling which the pressure sensing device is exposed to.

What has been further needed is a simply constructed pressure sensing device which provides reusable and snap-fit attachment of a cap member to a body member so that electrical connections are achieved during assembly independent of any lead bonding requirement.

Other objects and advantages will become apparent from the following descriptions, taken in connection with the accompanying drawings, wherein are set forth by way of illustration and example certain embodiments of the present invention.

SUMMARY OF THE INVENTION

The present invention is a pressure transducer comprising a body member having a chamber opening extending through the body member. The body member comprises a first end for receiving a pressurized medium and a second end for supporting a pressure sensing device. A seal is provided for attaching the pressure sensing device to the body member second end and for providing a positive seal to maintain a high and low pressure separation at the body member second end. The pressure transducer further comprises a cap member constructed for snap fit attachment to the body member second end. The cap member comprises conductive elements for electrically sensing and transmitting signals generated by the pressure sensing device.

BRIEF DESCRIPTION OF THE DRAWINGS

FIG. 1 is a side elevation view of a fully assembled pressure sensing device having a body member and a snap-fit cap member.

FIG. 2 is a side sectional view of a pressure sensing device showing the preferred structure of the ramped ledge surfaces of the cap member and the body member.

FIG. 3 is a top plan view of a pressure sensing device cap member with the first end portions of leadframe conductive elements shown in phantom and with the second end portions of leadframe conductive elements protruding from the cap member externally facing side surface.

DETAILED DESCRIPTION WITH PREFERRED EMBODIMENTS

Figure 4:
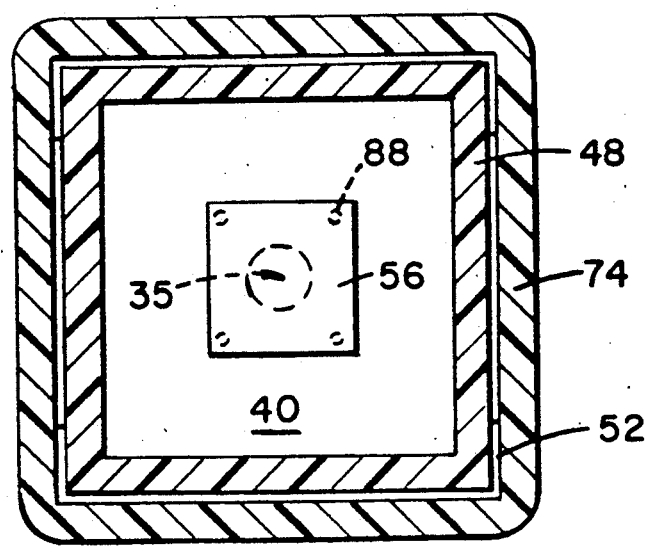
FIG. 4 is a top sectional view corresponding to lines 4—4 of FIG. 1 illustrating the neck extension on the body member second end and showing a representative transducer die arranged across the second end of the hollow pressure chamber.

As required, detailed embodiments of the present invention are disclosed herein. It is to be understood, however, that the disclosed embodiments are merely exemplary of the invention, which may be embodied in various forms. Therefore, specific structural and functional details disclosed herein are not to be interpreted as limiting, but rather as a basis for the claims and as a representative basis for teaching one skilled in the art to variously employ the present invention in virtually any appropriately detailed system or structure.

Referring to FIG. 1, a pressure sensing device 10 is shown. Pressure sensing device 10 preferably comprises a body member 12 and a cap member 18. Preferred pressure sensing device 10 also includes means for transmitting pressure-responsive signals from within device 10 to components external to device 10. Accordingly, representative leadframe conductive element 22 is shown with conductive element first end 24 located within cap member 18, and conductive element second end 26 protruding from cap member 18 to provide electrical connection with components external to device 10. Preferred device 10 includes means for connecting cap member 18 to body member 12 without any bonding requirement. As will be later shown, cap member 18 is constructed and arranged for snap-fit attachment to body member 12. Such snap-fit attachment provides inexpensive, reliable, and reusable cap members for pressure sensing devices.

FIG. 2 is a side elevation sectional view of preferred pressure sensing device 10. As shown in FIGS. 1 and 2, body member 12 is preferably an elongate shape. FIG. 2 illustrates elongate body member 12 first end 30 having a surface 32 defining a hollow chamber 35 which extends axially through body member 12 and is configured for receiving a pressurized medium. Body member 12 also comprises a second end 38 having a surface 40. Surface 40 comprises a recessed portion 44 which is located at second end surface 40 around hollow chamber 35 and which, in effect, forms a widened hollow chamber 35a at the body member second end. A second end neck extension 48 is also provided comprising an axially oriented neck extension from second end surface 40. Neck extension 48 comprises externally facing and flexible ramped ledge sections 52.

Preferred pressure sensing device 10 comprises transducer means for sensing the pressure of a medium in chamber 35. Transducer means thus preferably comprises a mechanical-to-electrical strain gauge transducer die 56 constructed and arranged with conductive elements that extend across chamber 35 in the vicinity of body member second end surface 40. A particular problem exists in prior art pressure sensing devices due to the undesired thermal cycling effect on pressure sensing membranes, such as those similar to transducer die 56. It is appreciated that transducer 56 is of a type commonly referred to as a strain-gauge. Transducer die 56 is thus representative of sensing means which are capable of enduring plastic elongation when exposed to a pressurized medium causing a different pressure on one side of the sensing means than on the other. As elongation of the membrane occurs, conductive elements located on the sensing means transmit correlative electrical signals to components external of the device. Thus, a determination of the sensed pressure of the pressurized medium is provided. However, significant error in the signal correlation is introduced when the pressure sensing device itself experiences compression or expansion due to ambient temperature cycling.

Accordingly, the present invention includes means for attaching transducer die 56 to body member 12 to provide reliable functioning of transducer die 56 independent of thermal cycling induced stresses. A preferred means for mounting transducer die 56 includes sealing means 60 located in recessed portion 44 of second end surface 40. Use of sealing means 60 also provides a positive seal to maintain high and low pressure separation across pressurized hollow chamber 35 at body member second end 38. Although various materials may be used for sealing means 60, a preferred sealing means material comprises an adhesive elastomer material. Even more preferably, a preferred adhesive elastomer material comprises a fluorosilicone material, such as that manufactured by General Electric Company under trade name FRV1106. It has been found that use of this fluorosilicone material provides optimum relief from thermal cycling induced stresses due to the inherent elastic qualities of the elastomer or fluorosilicone material. Indeed, for similar reasons, it is preferable that body member 12 and cap member 18 are each constructed of the same material, which is preferably a plastic material. As shown in FIG. 2 then, transducer die 56 is placed into sealing means 60 located substantially within recessed portion 44 so that thermal cycling induced stresses causing expansion or compression of body member 12 will not cause separation of sealing means 60 and resultant damage or separation of transducer die 56 or of sealing means 60 from body member 12. This results in a very highly reliable seal between body member 12 and transducer die 56, which translates into greater longevity of the preferred pressure sensing device 10.

Various means for mating the electrical connections in pressure sensing devices exist in the prior art. However, most prior art devices with any similarity to the present invention include electrical connections which require bonding for proper mating. By contrast, the present pressure sensing device 10 invention does not require any bonding of conductive elements to transducer die leads. Rather, the present invention relies upon a simple construction which permits a snap-fit attachment of cap member 18 onto body member 12. As will be detailed below, this snap-fit construction provides superior manufacturing economies as well as other advantages such as reusability, improved testing efficiency, and reduced man-hour per part ratios for construction and assembly.

Cap member 18 is preferably constructed for snap-fit attachment to body member 12 second end 38 as shown in FIGS. 1 and 2. Referring particularly to FIG. 2, the sectional view best illustrates the manner in which cap member 18 protects and partially contacts transducer die 56. Also, it is shown how the contact of cap member 18 and transducer die 56 permits electrical sensing and transmission of pressure-responsive shape changes of transducer die 56 to components external of device 10. More specifically, cap member 18 comprises a lead mounting portion 68 and circumferential wall portion 72. Wall portion 72 comprises a bottom surface 73, an externally facing side surface 74, and internally facing side ramped ledge surfaces 75, 76, and 77. These internally facing side ramped ledge surfaces 75, 76, and 77, are preferably constructed and arranged to provide biased and interlocking contact with body member neck extension 48 ramped ledge sections 52 so that part of lead mounting portion 68 of cap member 18 is mechanically biased into electrical contact with transducer die 56.

The assembled view of preferred pressure sensing device 10 shown in FIG. 2 illustrates the interlocking contact of the cap member 18 ramped ledge surfaces 75, 76, and 77 with body member neck extension flexible ramped ledge sections 52. A preferable attaching sequence includes moving cap member 18, wall portion bottom surface 73 toward body member 18 second end surface outer lip 40a. As ramped ledge surface 75 contacts and slightly biases flexible ramped ledge section 52, cap member surface 76 then snaps or springs into a fitted engagement against ramped ledge section 52. If it is determined that cap member 18 should be removed from body member 12, then all that would be required is to exert radial pressure generally in the direction of the arrows labelled A in FIG. 2. This radial pressure would release the neck extension 48 ramped ledge sections from interlocking contact with the ramped ledge surfaces of cap member 18. The resultant separation of cap member 18 from body member 12 could thus be readily accomplished, as well as the separation of cap member 18 from electrical contact with transducer die 56. It is appreciated that virtually identical advantage of the present invention may be achieved by providing a flexible cap and a rigid neck extension, or a suitable combination of both.

An important advantage of this invention is the providing of mechanically biased connection, rather than a bonded connection, between electrically conductive elements and a pressure sensing die of a pressure sensing device. One structure for achieving that objective is provided as shown in FIGS. 2, 3, and 4. As shown, preferred pressure sensing device 10 includes cap member 18 having lead mounting portion 68. Lead mounting portion 68 preferably comprises a metal-on-elastomer assembly with metal leadframe conductive elements 80. Leadframe conductive elements 80 comprise first end portions 82 which extend from cap member inner surface 81 and are preferably arranged for electrical contact with transducer die 56 conductive elements when cap member 18 is attached to body member 12. Leadframe conductive elements 80 also comprise second end portions 84 protruding from cap member 18 to provide electrical connection with components external to pressure sensing device 10. Preferred cap member 18 comprises lead mounting portion 68 constructed and arranged so that leadframe conductive elements 80 include first end portions 82 which are protectively embedded within lead mounting portion 68 and which also comprise second end portions protruding from cap member 18 externally facing side surface 74. Further, preferred leadframe conductive elements 80 comprise a gold plated leadframe. Also, as shown in FIG. 4, transducer die 56 may comprise a plurality of conductive metal bumps 88, such as gold bumps, arranged to facilitate mechanical and electrical contact between lead mounting portion 68, conductive elements first end portions 82, and transducer die 56.

From the foregoing, it can be seen that preferred pressure sensing device 10 provides enhanced reliability in environments which may experience thermal cycling. Also, preferred pressure sensing device 10 provides for rapid assembly and disassembly with a minimum of effort. This construction enhances manufacturing cycle efficiencies by permitting rapid testing of assembled devices while providing means for readily separating sub-components following negative test results. This not only saves time but it also saves substantial amounts of working and valuable individual sub-components which might otherwise be bonded to and discarded with failed sub-components. Finally, it is to be understood that while certain embodiments of the present invention have been illustrated as described, the invention is not to be limited to the specific forms or arrangement of parts herein described and shown.

What is claimed is:

1. A pressure sensing device, comprising:
   a) an elongated body member having a first end with a surface defining a hollow chamber extending axially through the body member for receiving a pressurized medium, and a second end with a surface defining a recessed portion and a neck extension, the recessed portion comprising a widening of the hollow chamber, and the neck extension comprising an axially oriented neck extension from the second end surface with externally facing and flexible ramped sections;
   b) transducer means for sensing the pressure of a medium in the chamber comprising a mechanical-to-electrical strain gauge transducer die having conductive elements extending across the chamber at the body member second end surface;
   c) sealing means located in the recessed portion of the second end surface for attaching the transducer die to the body member so that the transducer die will be substantially isolated from stresses caused by thermal cycling of the body member and for providing a positive seal to maintain high and low pressure separation across the hollow chamber at the body member second end; and
   d) a cap member constructed for snap-fit attachment to the body member second end to protect and contact the transducer die and to electrically sense and transmit pressure-responsive shape changes of the transducer die to components external of the device, the cap member comprising a lead mounting portion and circumferential wall portions, the wall portions comprising a bottom surface, an externally facing side surface, and internally facing side ramped surfaces constructed and arranged for biasing the body member neck extension and for interlocking contact with the body member neck extension ramped sections so that part of the lead mounting portion of the cap member is mechanically biased into electrical contact with the transducer die.

2. The pressure sensing device of claim 1 wherein the sealing means comprises an adhesive elastomer material.

3. The pressure sensing device of claim 2 wherein the adhesive elastomer material comprises a fluorosilicone material.

4. The pressure sensing device of claim 1 wherein the cap member lead mounting portion comprises a metal-on-elastomer assembly with metal leadframe conductive elements having first end portions arranged for electrical contact with the transducer die conductive elements when the cap member is attached to the body member, and second end portions protruding from the cap member for electrical connection with components external to the pressure sensing device.

5. A pressure sensing device of claim 4 wherein the transducer die comprises a plurality of conductive metal bumps arranged to facilitate electrical contact between the lead mounting portion conductive elements and the transducer die.

6. A pressure sensing device of claim 5 wherein the conductive metal bumps comprise gold bumps.

7. A pressure sensing device of claim 1 wherein the body member and the cap member are constructed of plastic material.

8. The pressure sensing device of claim 1 wherein the cap member lead mounting portion comprises a gold plated leadframe.

9. The pressure sensing device of claim 8 wherein:
   a) a portion of the leadframe is protectively embedded within the cap member; and
   b) the leadframe comprises end portions which protrude from the cap member wall portion externally facing side surface.

* * * * *